C. L. PECK.
HARROW.
APPLICATION FILED DEC. 3, 1913.
1,166,249.
Patented Dec. 28, 1915.
2 SHEETS—SHEET 2.
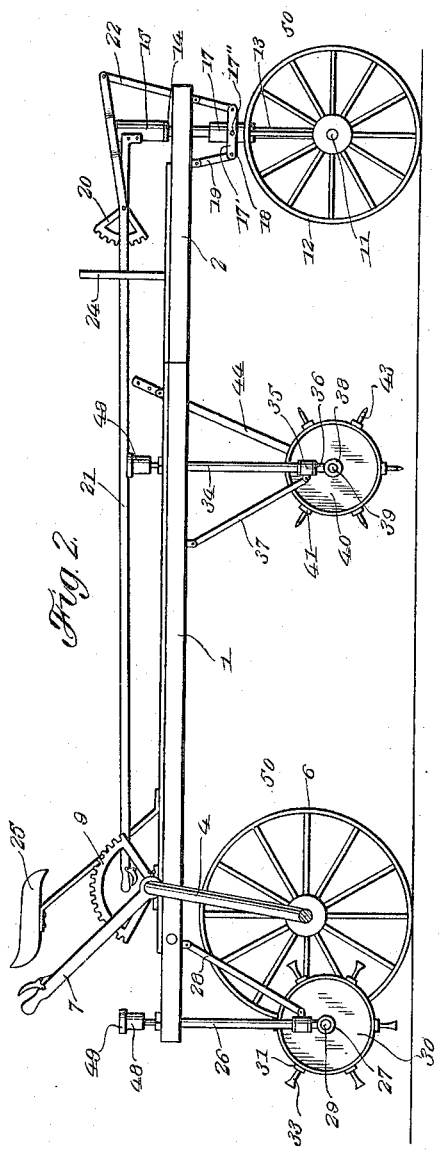
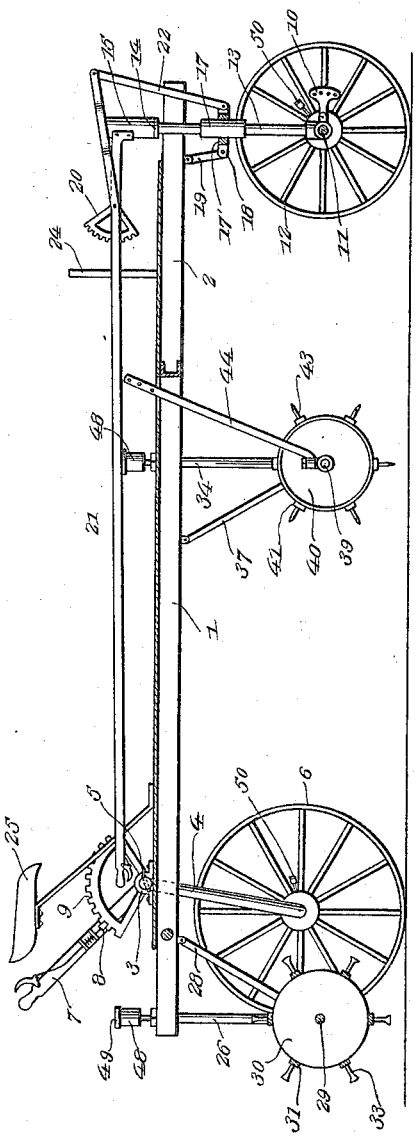
Witnesses
J. H. Crawford
K. Peacock
Inventor
C. L. Peck,
By Victor J. Evans
Attorney

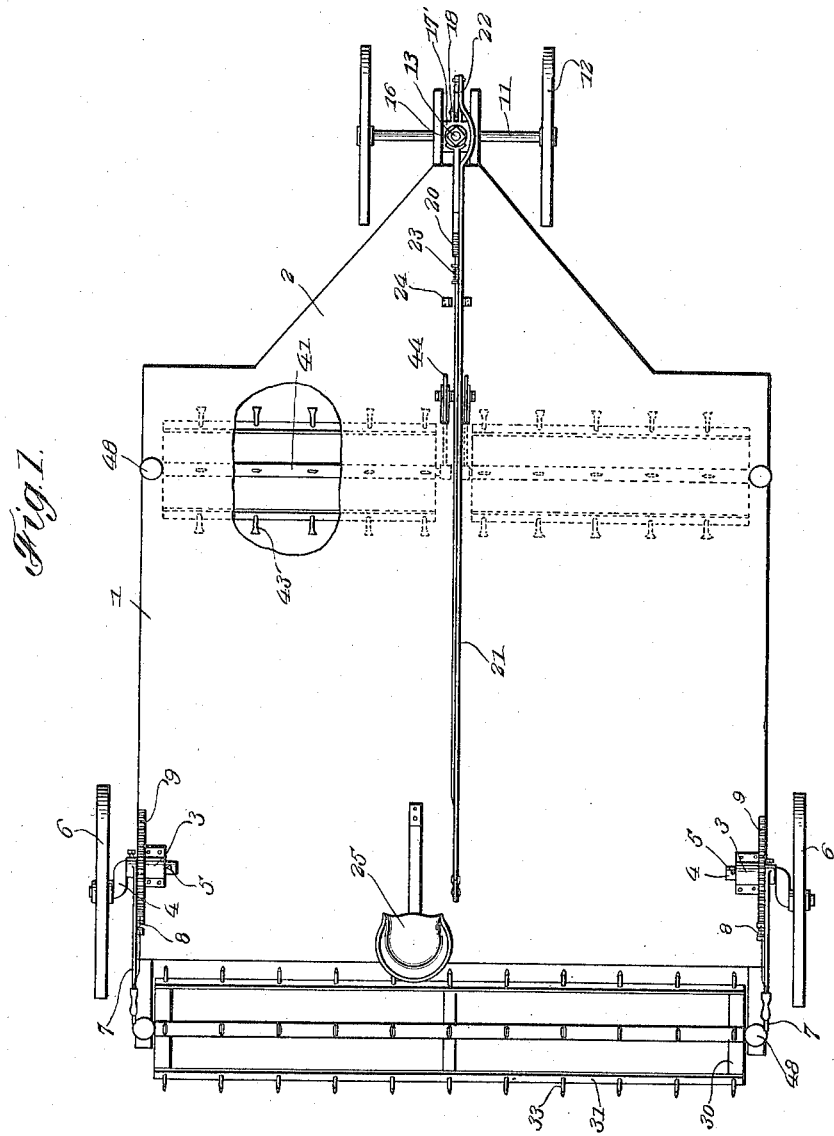

UNITED STATES PATENT OFFICE.

CHARLES L. PECK, OF COOPERSVILLE, MICHIGAN.

HARROW.

1,166,249.

Specification of Letters Patent.   Patented Dec. 28, 1915.

Application filed December 3, 1913.   Serial No. 804,495.

*To all whom it may concern:*

Be it known that I, CHARLES L. PECK, a citizen of the United States, residing at Coopersville, in the county of Ottawa and State of Michigan, have invented new and useful Improvements in Harrows, of which the following is a specification.

This invention relates to harrows and it consists in the novel features hereinafter described and claimed.

An object of the invention is to provide a harrow with two sets of rotating drums one drum being mounted upon a shaft journaled for rotation in fixed bearings and the members of the other set of drums being mounted so that the drums may be positioned at a desired angle with relation to the line of draft of the harrow.

With the above and other objects in view the harrow comprises a frame or platform carrying the rear portions of its side bearings in which are journaled crank axles. Means is provided for turning the axles in the bearings and for securing the same at adjusted positions. Supporting wheels are journaled upon the axle and are adapted to travel upon the surface of the ground. A wheel mounted truck is located under the forward portion of the frame and a vertically disposed shaft is supported upon the said truck. A lever mechanism is operatively connected with the shaft and is also pivotally connected with a sleeve slidably mounted upon the shaft. Links connect the said sleeve with the forward portion of the frame of the harrow. Means is provided for holding the lever of the said mechanism at an adjusted position.

The rear drum is mounted upon a shaft which is journaled in fixed bearings and the axis of the said shaft is disposed at a right angle to the line of travel of the harrow. The forward drums are journaled in movable bearings and a lever mechanism is operatively connected with the last mentioned drums whereby they may be swung from positions at right angles to the line of draft to positions at acute angles with relation to the said line. The said drums carry harrow teeth and consequently it will be seen that as the harrow is moved over the soil the soil is subjected to two distinct harrowing operations.

In the accompanying drawings:—Figure 1 is a top plan view of the harrow. Fig. 2 is a side elevation of the same. Fig. 3 is a vertical longitudinal sectional view of the same. Fig. 4 is a detail view of part of the harrow partly in section.

The harrow comprises a platform or frame 1 which is preferably formed from angle iron and sections of pipe. The said frame 1 is provided with a forward pointed end 2. Bearings 3 are mounted upon the side edge portions of the frame 1 in the vicinity of the rear end thereof and crank axles 4 are journaled in the said bearings. The said axles 4 are held against longitudinal movement in the bearings by means of pins 5 which pass transversely through the inner end portions of the said axles and which are adapted to engage the inner ends of the bearings 3. Ground wheels 6 are journaled for rotation upon the outer ends of the crank axles 4 and the centers of the said wheels are disposed at one side of the centers of the bearings 3. Levers 7 are fixed with relation to the crank axles 4 and carry spring pressed pawls 8 which are adapted to engage the teeth of dentate segments 9 fixed to the frame 1.

By this arrangement it will be seen that by swinging the levers 7 the ground wheels 6 may be moved so that their centers are carried toward or away from the frame 1 and inasmuch as the said ground wheels travel upon the surface of the soil the shifting of the wheels as indicated will raise or lower the rear portion of the frame 1. After the wheels have been properly adjusted with relation to the frame they are secured by permitting the pawls 8 to engage the segments 9.

A draft clevis 10 is pivotally mounted at the forward end of the frame 1 and may be of any desired pattern.

A supporting truck is located under the forward portion of the frame 1 and comprises an axle 11 having ground wheels 12 journaled at the end portions thereof. A vertically disposed shaft 13 is mounted upon the axle 11 at a point approximately midway between the ends thereof and passes up through the forward portion of the platform or frame 1. A collar 14 is fixed to the upper portion of the shaft 13 and sleeve 15 rests at its lower end upon the said collar and surrounds the upper portion of the said shaft. The said sleeve is held in position upon the shaft by means of a nut 16 which is screw threaded upon the upper end of the shaft 13. A sleeve 17 is slidably mounted upon the shaft 13 at a point below the collar 14. A block 17' is adjustably secured to the sleeve 17 by means of set screws 17" and is provided with five sets of outwardly disposed lugs 18. Links 19 are pivotally connected at their lower ends with the members of four of the sets of lugs 18 and are pivotally connected at their upper ends with the frame or platform 1. A dentate segment 20 is fixed with relation to the sleeve 15 and a lever 21 is fulcrumed to the said segment. The working end of the lever 21 is pivotally connected with the block 17' by means of a link 22 the lower end of which is pivotally attached to the third set of lugs 18. The lever 21 carries a spring pressed pawl 23 which is adapted to engage the teeth of a segment 21 and hold the said lever at an adjusted position with relation to the segment. The power end portion of the lever 21 passes through a guide 24 which is mounted upon the frame 1 and the said guide restrains the lever from swinging in a direction transversely to the line of travel of the harrow.

It will be seen that by swinging the lever 21 the link 22 will be moved longitudinally whereby the sleeve 17 will be moved vertically along the shaft 13 and inasmuch as the said sleeve 17 is connected with the frame 1 by means of the links 19 the forward portion of the frame 1 is raised or lowered. When the forward portion of the frame is positioned at a desired point above the surface of the ground the pawl 23 is permitted to engage the teeth of the segment 20 when the parts will be held at the adjusted positions. An operator's seat 25 is mounted upon the frame 1 and the power end of the lever extends back toward the said seat and may be used by one occupying the seat.

Standards 26 depend from the corner portions of the rear part of the frame 1 and carry at their lower ends bearings 27. Braces 28 connect the intermediate portions of the standards 26 with the side portions of the frame 1 and effectually brace the said standards in their positions with relation to the frame. A shaft 29 is journaled for rotation in the bearings 27 and extend transversely across the line of draft or travel on the harrow at a right angle to the same. Disks 30 are fixed to the shaft 29 and longitudinally disposed bars 31 connect the said disks together. The said bars 31 carry teeth 33 which pass through the bars 31 and the outer pointed end portions of the said teeth project beyond the outer sides of the bars.

Standards 34 are pivotally mounted at the forward side edge portions of the frame 1 and collars 35 are loosely mounted thereon. The said collars are restrained against movement longitudinally of the standards 34 by means of annular rings 36 which are fixed to the said standards. Braces 37 are connected at their upper ends with the frame 1 and at their lower ends with the collars 35 and serve to support the standards 34 in proper position with relation to the frame 1. The standards 34 are provided at their lower ends with bearings 38. Shafts 39 are journaled at their outer ends in the bearings 38 and disks 40 are mounted upon the said shafts. The said disks 40 are connected together by means of bars 41. Harrow teeth 43 pass through the bars 41 and are secured in position with relation to the said bars so that their outer pointed end portions project beyond the sides of the bars. These teeth 43 are twisted at their outer portion in order that they may operate in the soil to slightly stir the same as the cylinders rotate. Bars 44 are pivotally connected with the inner ends of the shafts 39 and the forward ends of the said bars are adjustably connected with the frame 1. Therefore it will be seen that by adjusting the bars 44 the inner ends of the shafts 39 will be swung forwardly or rearwardly. By this means the axis of the shafts 39 may be positioned at desired angles with relation to the line of draft or travel of the harrow.

The standards 26 and 34 are bored longitudinally and these bores constitute oil passageways leading to the bearings 27 and 38. Oil cups 48 are mounted at the upper ends of the said standards 26 and 34 and communicate with the said bores. These cups are adapted to hold cotton waste which may be saturated with oil and the cups are provided with spring retained caps 49 which when closed prevent dust from entering the cups. The said cups are adapted to supply oil to the shafts journaled in the bearings 27 and 28.

Oil cups 50 are mounted upon the hubs of the ground wheels 6 and 12 and are adapted to contain saturated waste for the purpose of supplying oil to the bearing surfaces of the said hubs.

Having described the invention what is claimed is:—

A harrow comprising a frame, a standard journaled in the frame at the edge portion thereof and extending vertically through the frame and provided at its lower end with a bearing, a shaft journaled at one end in the bearing, a soil engaging member carried by the shaft, a bearing receiving the other end of the shaft, a bar pivotally connected with the last mentioned bearing at a point in vertical alinement with the axis of the shaft and engageable with the intermediate portion of the frame and means for adjustably connecting said bar with the frame.

In testimony whereof I affix my signature in presence of two witnesses.

CHARLES L. PECK.

Witnesses:
E. L. MARVIN,
ALTA TAYLOR.